March 22, 1966  W. LOTTER  3,241,542
COOKING RANGE

Filed June 4, 1962  6 Sheets-Sheet 1

INVENTOR.
WILLIAM LOTTER
BY
Eugene C. Knoblock
ATTORNEY

March 22, 1966  W. LOTTER  3,241,542
COOKING RANGE
Filed June 4, 1962

INVENTOR.
WILLIAM LOTTER
BY Eugene C. Knoblock
ATTORNEY

March 22, 1966 — W. LOTTER — 3,241,542
COOKING RANGE
Filed June 4, 1962 — 6 Sheets-Sheet 3

INVENTOR.
WILLIAM LOTTER
BY Eugene C. Knoblock
ATTORNEY

March 22, 1966 W. LOTTER 3,241,542
COOKING RANGE
Filed June 4, 1962 6 Sheets-Sheet 4

INVENTOR.
WILLIAM LOTTER
BY
Eugene P. Knoblock
ATTORNEY

March 22, 1966 — W. LOTTER — 3,241,542
COOKING RANGE
Filed June 4, 1962 — 6 Sheets-Sheet 6

INVENTOR.
WILLIAM LOTTER
BY Eugene C. Knoblock
ATTORNEY

United States Patent Office 3,241,542
Patented Mar. 22, 1966

3,241,542
COOKING RANGE
William Lotter, South Bend, Ind., assignor to South Bend
Range Corporation, South Bend, Ind., a corporation of
Indiana
Filed June 4, 1962, Ser. No. 199,937
12 Claims. (Cl. 126—39)

This invention relates to improvements in cooking ranges, and more particularly to ranges having top plates upon which food can be cooked.

The primary object of this invention is to provide a cooking range with a top plate wherein the range is so constructed as to enable the range top to be heated to cooking temperature rapidly with minimum fuel consumption and in a controlled manner so as to produce efficient cooking, minimize the heat in a kitchen prior to cooking, and provide effective control of the range by the chef at all times.

A further object is to provide a cooking range construction which utilizes heat generating burners producing infra red energy, wherein the range is so constructed that heating energy from the burners is concentrated at a cooking top plate and heat losses occurring at vertical walls of the range structure and heat escape at the flue are reduced to a minimum.

A further object is to proivde a cooking range construction utilizing a ray head type burner and a pressurized primary air chamber to supply air to support combustion, wherein the parts are so constructed and arranged as to balance the temperature differential occurring at the ray head burners so that flashback does not occur and to maintain an operating temperature of the ray head burners below that producing flashback of the gas and air mixture.

A further object is to proivde a cooking range construction with ray head burners so mounted and arranged within a range cabinet that all air required to support combustion is obtained from a pressurized primary air source and no secondary air supply source is required, whereby the cabinet need not be proivded with a space normally utilized for a secondary air supply system, and whereby heat losses are reduced and delays occasioned by the need to heat secondary air are eliminated.

A further object is to provide a cooking range utilizing ray head burners and a pressurized air supply wherein a solenoid valve is utilized to serve as a safety control to prevent overheating of the ray head burners in the event the blower or other source of air pressure of the pressurized air system becomes inoperative.

A further object is to provide a cooking range utilizing ray head burners and a pressurized air source and air supply system which includes a collection box and air directing means so constructed and arranged as to direct air flow around each ray head burner to support combustion and to maintain the operating temperature of the ray head burners at a predetermined value.

Other objects will be apparent from the following specification.

Figure 6:
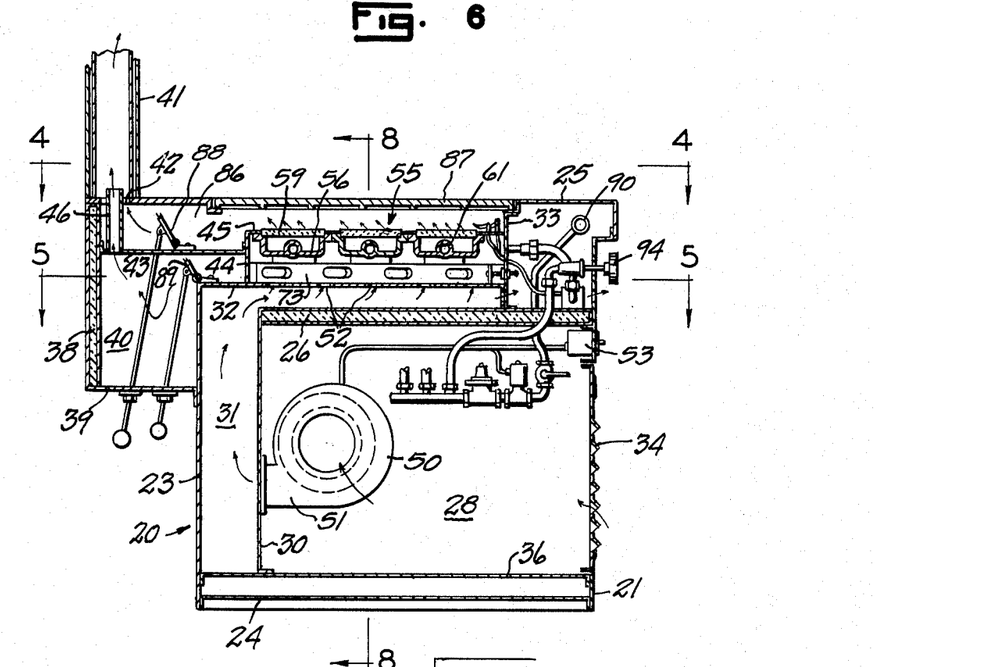
FIG. 6 is a vertical sectional view taken on line 6—6 of FIG. 4.

Referring to the drawings which illustrate the preferred embodiment of the invention, the numeral 20 designates a range cabinet having a front wall 21, side walls 22, rear wall 23, bottom wall 24, and top wall 25. A horizontal partition 26 extends from side to side of the cabinet spaced below the top 25 thereof and preferably extends from front wall 21 to a point spaced forwardly of the rear wall 23. A vertical partition 27 may be employed to divide the space below the partition 26 into an air chamber 28 and a storage compartment or other space 29. A vertical wall 30 spaced forwardly of the rear wall 23 cooperates with the partition 26 to define a passage 31 in the rear of the cabinet. The upper part of the passage, as best seen in FIG. 6, extends forwardly, being outlined by partition 26 and by a horizontal partition 32 spaced above the partition 26 and preferably extending full width of the cabinet but terminating in rearwardly spaced relation to the front wall 21 of the cabinet at a vertical transverse partition 33. The front wall 21 has openings therein, within one of which is mounted a louvered door structure 34 providing access to the lower air chamber 28. A door 35 mounted in another opening in the cabinet front 21 gives access to the chamber 29. If desired, false bottom panels 36 and 37 may be mounted in the cabinet spaced above the bottom 24 to define parts of the chambers 28 and 29. Selected parts of the cabinet, such as the walls 22 and 23 and the partitions 26 and 27, may be of insulated construction; for example, of a construction characterized by spaced metal panels and an intervening filler of heat insulation material of any suitable character.

The cabinet may have a rearward projection as illustrated in FIG. 6, characterized by an upper rearwardly offset rear wall part 38 and a horizontal bottom wall part 39 cooperating with projections of the side walls to define a chamber 40. A flue 41 projects upwardly from the offset rear portion of the range cabinet. The flue communicates with the upper portion of the range cabinet through range top openings 42. A partition 43 defines the top of the chamber 40 and is spaced below the top wall 25 and projects rearwardly from a rear wall 44 of a burner mounting structure characterized by an apertured top plate 45 preferably positioned horizontally in spaced relation below the level of the cabinet top 25. One or more openings formed in the partition 43 communicate with tubes 46 which preferably extend from the partition 43 to a height above the cabinet top 25, the same passing with clearance through the top openings 42 so that their upper ends are located within the flue 41.

A motor-operated blower 50 is mounted in the chamber 28, and the outlet of the blower at 51 communicates with an aperture (not shown) in the vertical partition 30 to discharge air into the passage 31 and the space below the plate 32. The plate 32 has a plurality of apertures 52 therein through which air passes to enter the portion of the cabinet above the partition 32. Air enters the lower chamber 28 through the spaces or openings in the louvered door 34. Any suitable control 53 for the blower may be provided in the device, the same preferably being mounted on the front wall panel 21.

Figures 1, 2, 3:
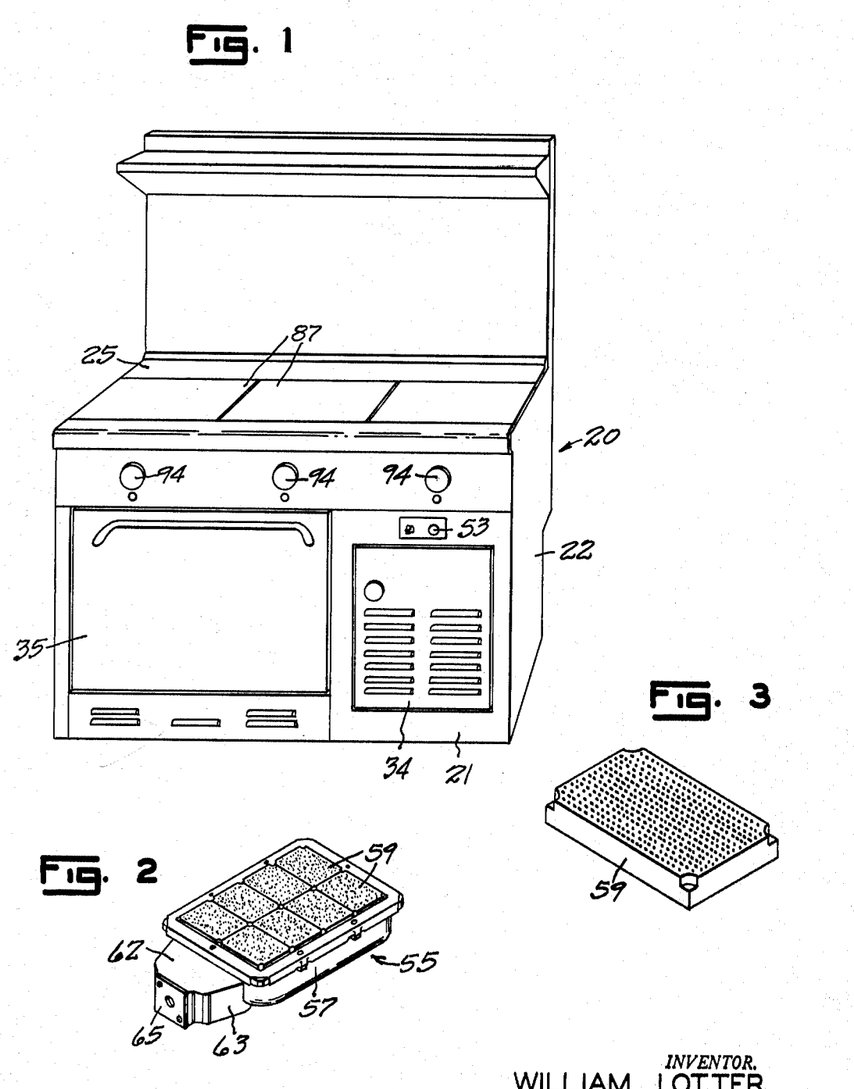
FIG. 1 is a front perspective view of a cooking range embodying my invention.
FIG. 2 is a perspective view of a ray head burner assembly.
FIG. 3 is a perspective view of a ray head burner element.
Figure 4:
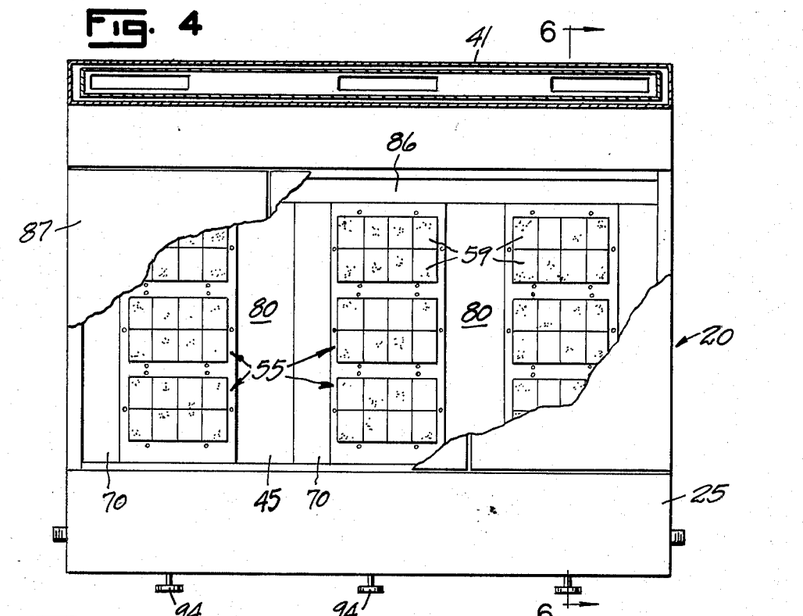
FIG. 4 is a view taken on line 4—4 of FIG. 6, with parts broken away to illustrate the arrangement of ray head burners within a range cabinet.
Figure 5:
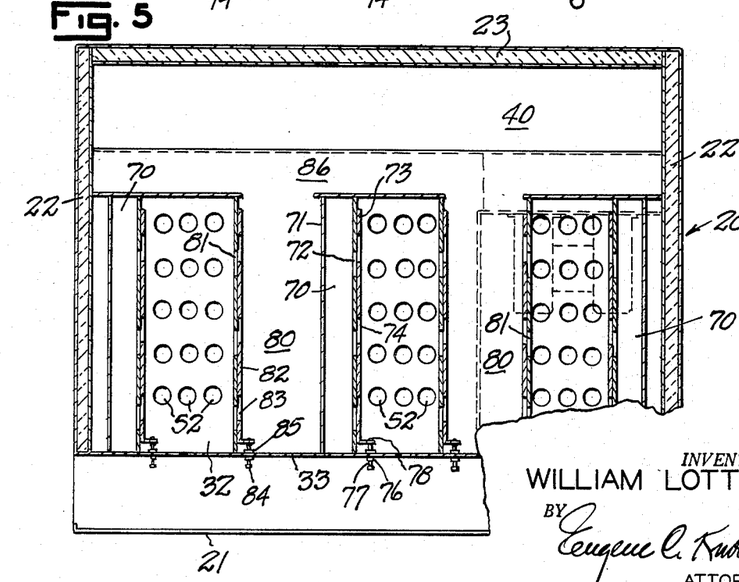
FIG. 5 is a fragmentary horizontal sectional view taken on line 5—5 of FIG. 6.
Figure 9:
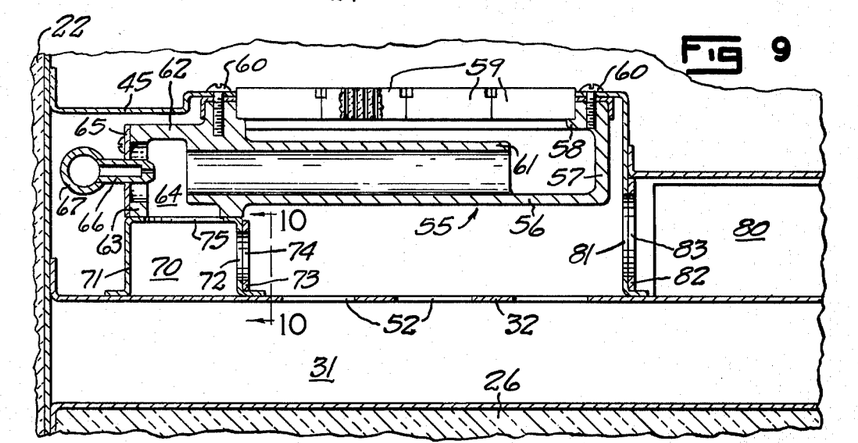
FIG. 9 is an enlarged fragmentary detail sectional view taken on line 9—9 of FIG. 11.

A plurality of burner units, which may be of the ray head type illustrated in FIGS. 2, 3 and 9, or of any other type capable of producing infra red heating energy, are mounted in the space above the partition 32 and are supported by the apertured burner mounting top wall 45 at the apertures in the wall 45. In the form shown in FIGS. 2, 3, 6 and 9, each burner unit includes a pan-shaped metal casting having a bottom 56, marginal walls 57 and flanges 58 adjacent its upper end utilized to support burner elements, such as elements 59 of the ray head type. The burner elements 59 preferably constitute blocks of ceramic material having a large number of small passages therethrough distributed substantially uniformly. The blocks or plates 59 are preferably of the character described in U.S. Patent 2,775,294. In one form these blocks are approximately 7/16 inch thick and are provided with approximately two hundred ports or passages per square inch. It will be understood, however, that the use of ceramic blocks is not essential and that metal plates or a plurality of screens or reticulated members having suitable metallic composition or alloy may span the burner casting to provide uniformly spaced small apertures therethrough.

The casting of each burner unit is preferably secured to the apertured burner top wall 45 by securing means, such as screws 60. The casting preferably includes also a tubular internal structure 61 preferably extending horizontally in spaced relation below the burner elements 59 and open at both ends thereof for passage of gaseous material, such as a fuel-air mixture, into the interior of the burner mounting casting below the burner elements 59. The casting also preferably includes a laterally projecting overhanging flange 62 and depending side and end flanges 63 outlining a chamber 64 which is open at its bottom and with which the outer end of the tube structure 61 communicates. The end flange 63 is apertured and is preferably spanned by a cover plate 65 through an aperture of which projects one or more nozzle or jet 66 each communicating with a gas supply conduit, such as conduit 67.

Figure 10:
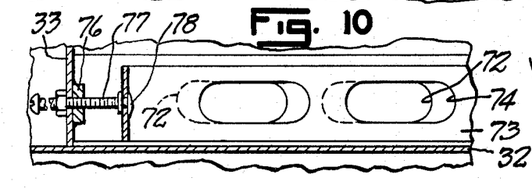
FIG. 10 is a fragmentary vertical detail sectional view taken on line 10—10 of FIG. 8.
Figure 11:
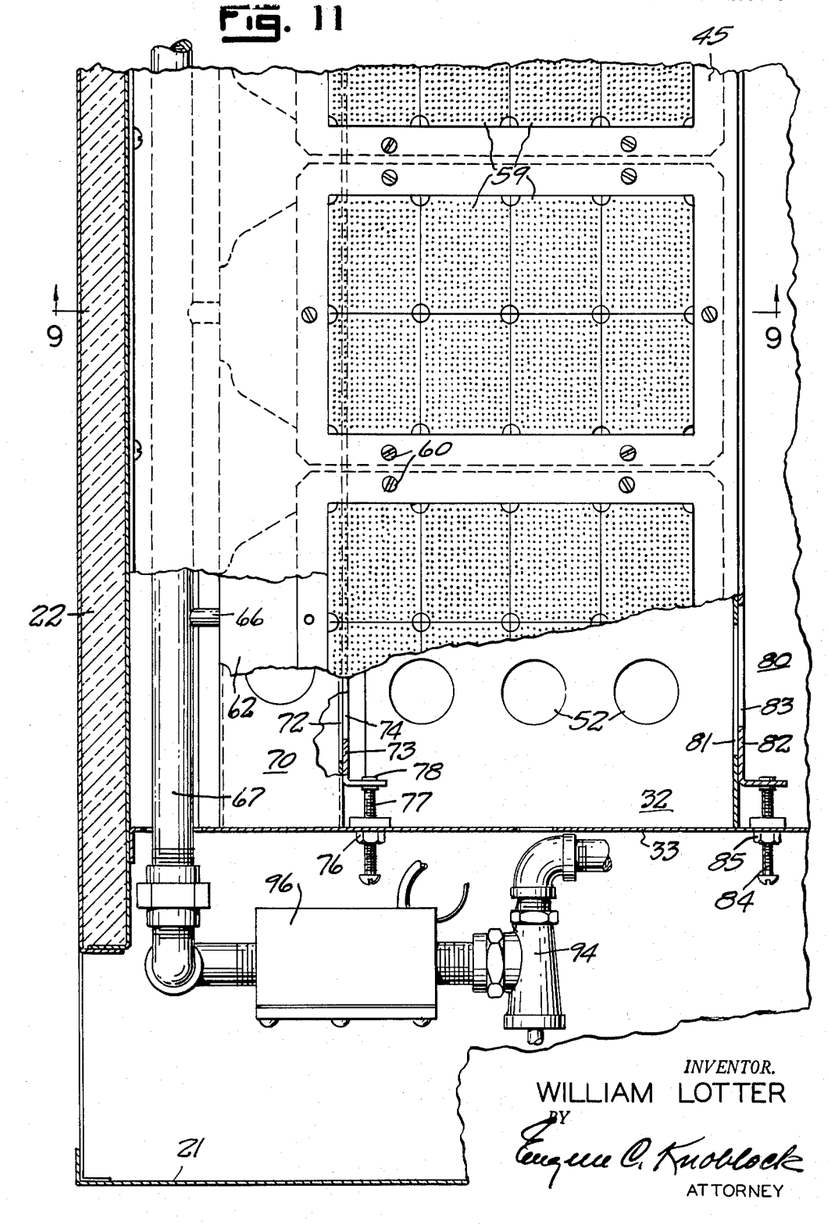
FIG. 11 is an enlarged fragmentary horizontal sectional view taken on line 11—11 of FIG. 8.

One or more primary air chambers or passages 70, each preferably elongated in character and extending from front to rear of the cabinet and juxtaposed to the chambers 64 of a row of burner units, is mounted upon plate 32. One such primary air chamber 70 is associated with each burner unit. As here illustrated, the primary air chambers 70 are defined by sheet metal structures of inverted U-shape mounted on the plate 32 and preferably supporting or in contact with the lower edges of flanges 63 and other parts of the burner casting around the chamber 64 thereof. The primary air chambers 70 are preferably located spaced from the apertures 52 in the plate 32, and each thereof is provided with one or more openings, such as a plurality of spaced elongated apertures 72 preferably at a side wall thereof. An adjustable baffle plate 73 has apertures 74 therein and bears against the wall of the air chamber having the aperture 72 therein. Baffle plate 73 is adjustable lengthwise of the air chamber wall so as to control the extent of register of the apertures 72 and 74, and thereby control the rate at which air can enter the primary air chamber 70 after passing from passage 31 through apertures 52. The primary air chamber has discharge apertures 75 at its top which establish communication between the chambers 64 and 70. Adjustment of the baffle plate 73 can be effected in any suitable manner. Thus as here shown in FIGS. 10 and 11, the vertical partition 33 may mount screw-threaded nut members 76 adjustably receiving screw-threaded shanks 77 of adjustment members whose inner ends have rotatable connection 78 with one end of baffle plate 73.

One or more horizontal flue passages 80 are provided in the cabinet above the partition 32 by any suitable structure. Each of these passages 80 is located spaced from apertures 52 in the partition 32 and has a plurality of apertures 81 therein, preferably at a vertical wall thereof. A baffle plate 82 having a plurality of apertures 83 therein regulates the amount of air which can pass into the horizontal flue passage 80. Any suitable means to adjust the setting of the baffle plate 82, such as adjustment screw 84, connected to the baffle plate and screw-threaded in a nut 85 carried by the partition 83, may be provided. Each of the horizontal flue passages 80 communicates with a rear surplus air duct 86 having communication with the flue 41.

It will be understood that the range cabinet will mount one or more top plates 87 in openings in the cabinet top 25. The plates 87 are positioned spaced above the burner elements 59 so as to provide a passage through which the products of combustion may pass to the flue opening 42 in the range top. If desired a damper 88 may be pivoted in duct 86 and a damper 89 may be pivoted near chamber 40, as shown in FIG. 6.

A gas or other fuel supply line 90 is connected to the range. Gas flows from line 90 to the conduits 67 which feed the individual burners and in which suitable controls are provided. These controls may include those illustrated in FIG. 7, such as a shut-off valve 92, a solenoid actuated valve 93 and a modulating and shut-off valve 94. Other elements, such as a gas pressure regulator 95 and an automatic pilot valve 96 may also be included in the gas supply system. The automatic pilot valve 96 will preferably control the supply of gas to pilot burner 97 for igniting the fuel-air mixture at the burner elements 59. The solenoid valve 93 will preferably be controlled by the switch 53 which serves to control the motor of the blower 50. Thus the coil 98 of the solenoid may be connected in a circuit in parallel to the blower motor 50 and in parallel to an igniter element 99. In this manner correlation of the functions of fuel supply, fuel ignition and air supply is effected through the master control switch 53.

In the operation of the range, supply of fuel and supply of air are coordinated by the switch 53, but individual control of the supply of fuel to different burner elements is manually controlled through the respective regulating or modulating valves 94 which preferably permit selection of the rate of flow of gas to the burners. The gas fed to each burner supply conduit 67 is in turn discharged therefrom through jets 66 into a mixing chamber 64. The mixing chamber is in communication with a primary air chamber 70 to which a regulated supply of air under positive pressure is supplied by blower 50, the rate of supply of air depending upon the setting of the baffle plate 73 associated with said primary air chamber. The gas-air mixture is effected as the gas and air pass through the tube 61 into the chamber below the ray head elements or other apertured burner elements 59 through which the gas passes and at which ignition occurs. The heating elements 59 heat the range plate 87 directly thereabove with an efficient heat transfer, and the elements 59 themselves are protected by the differential of temperature existing between the bottom and top thereof by virtue of the pressurizing of the fuel-air mixture supplied thereto.

A further factor of importance is that the present system reduces the possibility of flashback inasmuch as total reliance for the air necessary to support combustion is placed upon the primary pressurized air source, and no secondary air source is needed.

Maintenance of the operating efficiency of the device and service of the burner units over long periods of operation is insured by virtue of the washing of pressurized air against the parts of the burner unit castings and associated parts at which combustion does not occur. Observe in this connection that air from passage 31 passing through the openings 52 into the structure which mounts the burners travels by circuitous paths so that the bottom and sides of the burner units at 56 and 57 are washed by air as the air travels from the openings 52 to and through the registering openings 72 and 74 leading to the primary air chamber 70 and in turn into the mixing chamber 66, and also through the elongated tubular part 61. Any excess or surplus air is diverted through the passage 80 and the amount diverted is determined by the setting of the baffle plate 82 which determines the extent of register of the openings 81 and 83 leading to passage 80. This surplus air also serves to wash or lave the burner units and to prevent excess heat which would produce flashback or which would be detrimental to long continued operation of the unit.

One of the most important characteristics of the device is that it is possible to attain cooking temperatures very rapidly and it is not necessary to operate the burners for prolonged periods in order to bring the range plate 87 to cooking temperature. In one embodiment of the invention, it is possible to bring the range top plates 87 from cold or ambient temperature to operating temperature within twelve minutes. This result has been achieved in a construction utilizing ceramic or ray head type burners which are characterized by the production of infra red heating energy. Such heating energy serves to heat only objects in its path, in this instance the top plate 87, and it does not heat surrounding parts of the range to any substantial or wasteful extent. Consequently, the device has the additional advantage of economy of operation, of long life of the heating elements and other range parts is assured by the cooling factor. The cooling factor is enhanced by the diversion of enough air under pressure into the space around the various control valves to hold these valves at low temperature. The combination of the controlled pressurized air flow and the use of ceramic burners prevents the achievement of a temperature in the burners of such a value as would cause flashback to issue.

The use of a solenoid valve serves as a safely control against overheating of the burner elements inasmuch as it insures that operation of the burners cannot occur without simultaneous operation of the blower to supply the required flow of air in the chamber for cooling purposes as well as for supply for mixture with the fuel. In other words, since the burners must rely solely on the primary air source to support combustion, the burners do not function to produce cooking heat if the blower does not function.

Figure 7:
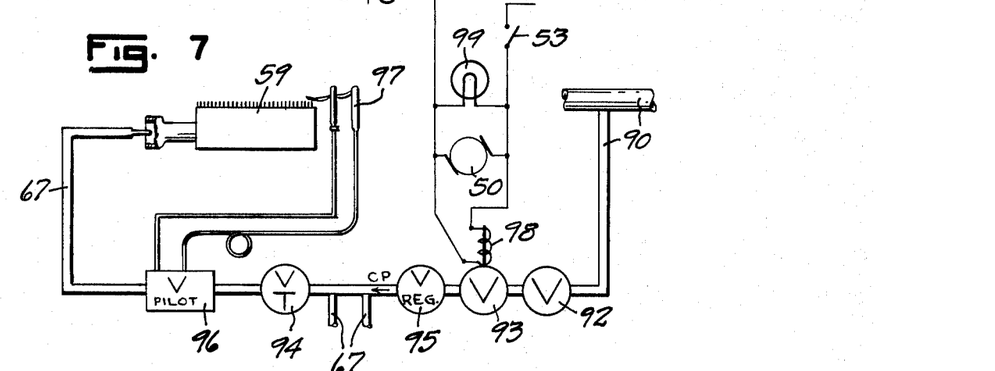
FIG. 7 is a schematic view illustrating a control system utilized in the device.
Figure 8:
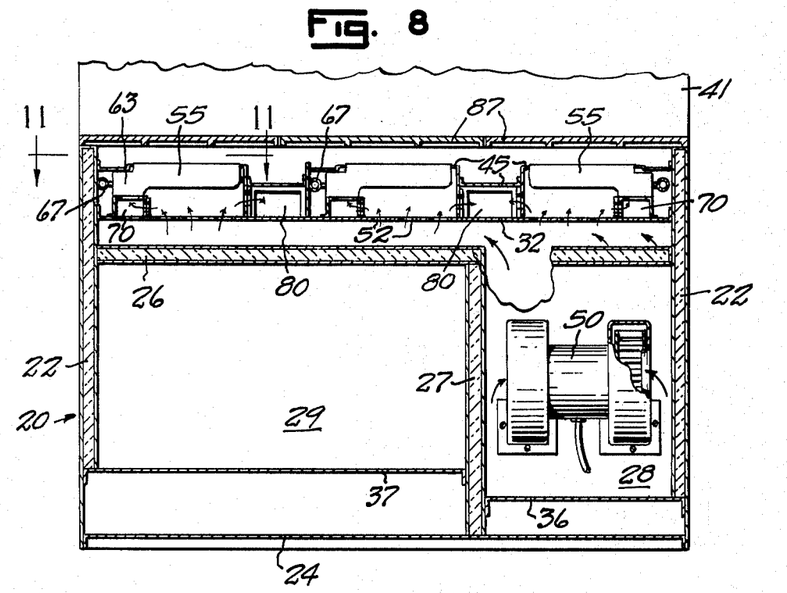
FIG. 8 is a vertical transverse sectional view taken on line 8—8 of FIG. 6, with parts broken away.
Figure 12:
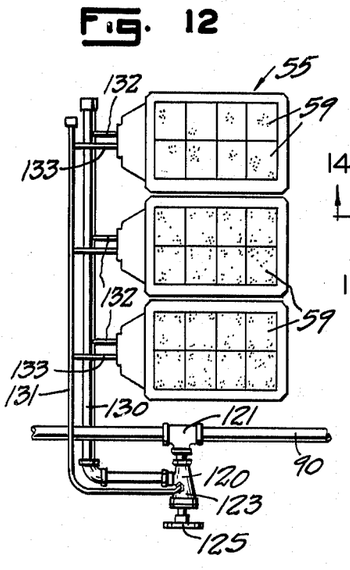
FIG. 12 is a top plan view of a modified embodiment of the invention.

FIGS. 12 to 21 illustrates a modification of the invention with respect to the means for controlling and modulating the supply of fuel to the burner units. Thus in FIG. 12 a group of three burner units is illustrated arranged for control of the supply of gas thereto by means of a single modulating valve 120 branching from supply line 90 which, it will be understood, has interposed therein a shutoff valve 92, a solenoid actuated valve 93 and a gas pressure regulator 95, as illustrated in FIG. 7. The modulating valve 120 is preferably of the character having an inlet 121 at its end opening into a bore 122 of a tapered valve plug 123 rotatable in a tapered body or housing 124 under control of a valve stem or handle 125. The valve body has two outlets 126 and 127 projecting therefrom and preferably displaced both radially and axially. The outlet 126 has a passage 128 which is of larger diameter than the passage 129 of the outlet 127. A conduit 130 communicates with outlet 126 and an outlet 131 communicates with outlet 127. The line 130 is preferably of larger cross-section than the line 131. The line 130 will be connected by branches 132 to jets 67 supplying gas to each of the burner elements in a given group. The line 131 will be connected to jets communicating with and supplying gas to one or more of the burner units. Thus, while branches 133 are shown in FIG. 12 extending to each of the burner units, it will be understood that jets may connect to only one burner unit or to any selected number less than all of the burner units.

Figure 13:
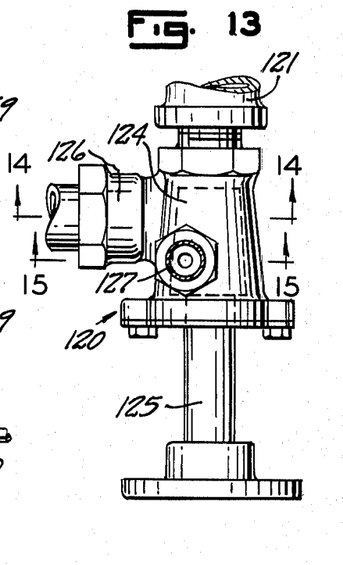
FIG. 13 is an enlarged detail view illustrating a valve employed in the embodiment of the invention shown in FIG. 12.

The valve plug 123 has a port 140 therein adapted to be aligned with the outlet 126 and of comparatively large diameter. A second port 141 is formed in the plug angularly displaced from the port 140 and in the same transverse plane as the opening 140 and the port 126. The valve plug also has a series of apertures 142, 143 and 144 positioned therein in a circumferential plane common to the outlet 129 and angularly displaced from each other.

Figures 14, 16:
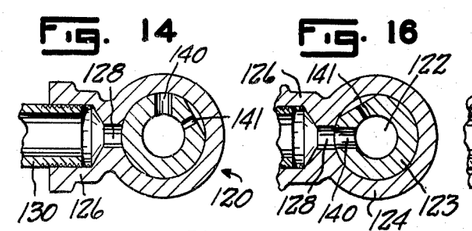
FIG. 14 is a sectional view taken on line 14—14 of FIG. 13 and illustrating one setting of the valve.
FIGS. 16 and 17 are taken, respectively, on lines 14—14 of FIG. 13 and lines 15—15 of FIG. 13, and illustrate a different setting of the valve.
Figure 15:
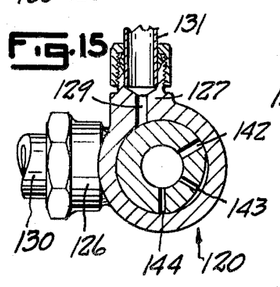
FIG. 15 is a sectional view taken on line 15—15 of FIG. 13, and illustrating the same valve setting shown in FIG. 14.
Figures 17, 19:
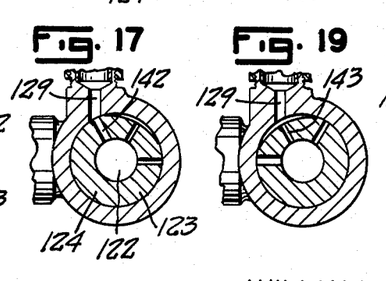
FIGS. 18 and 19 illustrate a third setting of the valve.
Figures 18, 20:
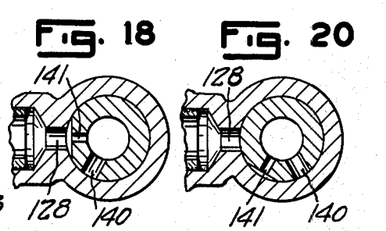
FIGS. 20 and 21 illustrate a fourth setting of the valve.
Figure 21:
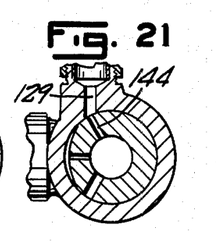

The ports are so oriented with respect to each other that three operating positions are provided which serve to modulate the supply of gas. FIGS. 14 and 15 illustrate the valve in the shutoff position at which no gas flows to either of the ports 128 or 129. FIGS. 16 and 17 illustrate the high or maximum rate of supply of gas with the port 140 communicating with the valve port 128 at the same time that the port 142 communicates with the port 129. FIGS. 18 and 19 illustrate an intermediate setting of the valve at which port 141 communicates with the port 128 while port 143 communicates with the port 129. FIGS. 20 and 21 illustrate the low setting at which the valve port 128 is closed and the only supply of gas is effected through ports 144 and 129.

While the preferred embodiments of the invention have been illustrated and described, it will be understood that changes in the construction may be made within the scope of the appended claims without departing from the spirit of the invention.

I claim:
1. A cooking range comprising
a cabinet having a top plate to be heated,
a plurality of burner units mounted in said cabinet spaced below said top plate,
each burner unit including a housing having a mixing chamber and a burner element spanning the top of said housing and having a large number of small apertures arranged therein uniformly,
means for supplying gas to each burner unit including a jet discharging gas into said mixing chamber thereof,
a primary air chamber communicating with the mixing chamber of each of said plurality of burners and constituting the sole source of air to support combustion,
means for supplying a regulated quantity of air under pressure to said primary air chamber, and
a flue connected to said cabinet for discharging therefrom the products of combustion from said burner elements.

2. A cooking range comprising
a cabinet having a top plate to be heated,
a plurality of burner units mounted in said cabinet spaced below said top plate,
each burner unit including a housing having a mixing chamber and a burner element spanning the top of said housing and having a large number of small apertures arranged therein uniformly,
means for supplying gas to each burner unit including a jet discharging gas into said mixing chamber thereof,
a primary air chamber communicating with each mixing chamber and constituting the sole source of air to support combustion, means for supplying air under pressure to said primary air chamber,
a flue connected to said cabinet for discharging therefrom the products of combustion from said burner elements, and
means for directing air from said air supply means through said cabinet to said flue in a path to wipe said burner housings for cooling the latter.

3. A cooking range comprising
a cabinet having a top plate to be heated,
a plurality of burner units mounted in said cabinet spaced below said top plate,
each burner unit including a housing having a mixing chamber and a burner element spanning the top of said housing and having a large number of small apertures arranged therein uniformly,
means for supplying gas to said burner units including a jet discharging gas into each mixing chamber,
a primary air chamber communicating with the mixing chamber of each burner unit and constituting the sole source of air to support combustion,
means for supplying air under pressure to said primary air chamber,
a flue connected to said cabinet for discharging therefrom the products of combustion from said burner elements, and
means for regulating the rate of supply of air from said air supply means to said primary air chamber.

4. A cooking range comprising
a cabinet having a top plate to be heated,
a burner unit mounted in said cabinet spaced below said top plate,
said burner unit including a housing having a mixing chamber and a burner element spanning the top of said housing and having a large number of apertures arranged therein uniformly,
means for supplying gas to said burner unit including a jet discharging gas into said mixing chamber,
a primary air chamber communicating with said mixing chamber and constituting the sole source of air to support combustion,
means for supplying air under pressure to said primary air chamber,
a flue connected to said cabinet for discharging therefrom the products of combustion from said burner elements,
a surplus air passage partially defined by said burner housing and connecting said air supply means to said flue, and
adjustable means regulating the rate of supply of air from said air supply means to said primary air chamber and to said surplus air passage.

5. A cooking range comprising
a cabinet having a top plate to be heated,
a plurality of burner units mounted in said cabinet spaced below said top plate,
each burner unit including a housing having a mixing chamber and a burner element spanning the top of said housing and having a large number of small apertures arranged therein uniformly,
means for supplying gas to said burner units including a jet discharging gas into each mixing chamber,
a primary air chamber communicating with each said mixing chamber and constituting the sole source of air to support combustion,
means for supplying a regulated quantity of air under pressure to said primary air chamber, and
a flue connected to said cabinet for discharging therefrom the products of combustion from said burner elements,
each burner element constituting a ceramic block heated by combustion of the air-fuel mixture to create infrared heating energy directed against said top plate.

6. A cooking range comprising
a cabinet having a top plate to be heated,
a plurality of burner units mounted in said cabinet spaced below said top plate,
each burner unit including a housing having a mixing chamber and a burner element spanning the top of said housing and having a large number of small apertures arranged therein uniformly,
modulated means for supplying gas to said burner units including a jet discharging gas into each mixing chamber,
a primary air chamber communicating with the mixing chambers of all said plural burner units and constituting the sole source of air to support combustion,
modulated means for supplying air under pressure to said primary air chamber,
a flue connected to said cabinet for discharging therefrom the products of combustion from said burner elements, and
control means for correlating actuation and modulation of said gas supply means and said air supply means.

7. A cooking range comprising
a cabinet having a top plate to be heated,
a plurality of burner units mounted in said cabinet spaced below said top plate,
each burner unit including a housing having a mixing chamber and a burner element spanning the top of said housing and having a large number of small apertures arranged therein uniformly,
means for supplying gas to each burner unit including a jet discharging gas into said mixing chamber,
a primary air chamber communicating with the mixing chambers of said plurality of burner units and constituting the sole source of air to support combustion,
means for supplying air under pressure to said primary air chamber, and
a flue connected to said cabinet for discharging therefrom the products of combustion from said burner elements,
said air supply means constituting a blower and an electric motor driving said blower,
said gas supplying means including a valve controlled by a solenoid, and
a control circuit having a master switch,
said blower motor and valve controlling solenoid being connected in said circuit for conjoint control by said master switch.

8. A cooking range comprising
a cabinet having a top plate structure to be heated,
a plurality of burner units mounted in said cabinet spaced below said top plate structure and arranged in groups each located adjacent a selected portion of said top plate structure,
each burner unit including a housing having a mixing chamber and a ceramic burner element spanning the top of said housing and having a plurality of close spaced small apertures arranged uniformly therein,
means for supplying gas to each burner unit including a jet discharging gas into the mixing chamber thereof,
a plurality of primary air chambers each correlated to the burners of a group and constituting the sole source of air to support combustion at the burners of said group,
each air chamber communicating with the mixing chamber of each burner of a group,
means for supplying a regulated quantity of air under pressure to each primary air chamber, and
a flue connected to said cabinet for discharging the products of combustion from said burner elements.

9. A cooking range comprising
a cabinet having a top plate structure to be heated,
a plurality of burner units mounted in said cabinet spaced below said top plate structure and arranged in groups each located adjacent a selected portion of said top plate structure, each burner unit including a housing having a mixing chamber and a ceramic burner element spanning the top of said housing and having a plurality of close spaced small apertures arranged uniformly therein, means for supplying gas to each burner unit including a jet discharging gas into the mixing chamber thereof, a plurality of primary air chambers each correlated to the burners of a group and constituting the sole source of air to support combustion at the burners of said group, each air chamber communicating with the mixing chamber of each burner of a group, means for supplying air under pressure to each primary air chamber, a flue connected to said cabinet for discharging therefrom the products of combustion from said burner elements, and means for selectively regulating the flow of air from said supply means to each primary air chamber.

10. A cooking range comprising
a cabinet having a top plate structure to be heated,
a plurality of burner units mounted in said cabinet spaced below said top plate structure and arranged in groups each located adjacent a selected portion of said top plate structure,
each burner unit including a housing having a mixing chamber and a ceramic burner element spanning the top of said housing and having a plurality of close spaced small apertures arranged uniformly therein,
means for supplying gas to each burner unit including a jet discharging gas into the mixing chamber thereof,
a plurality of primary air chambers constituting the sole source of air to support combustion at said burners,
each air chamber communicating with the mixing chamber or burner of a group,
means for supplying air under pressure to each primary air chamber,
a flue connected to said cabinet for discharging from the cabinet the products of combustion from said burner elements, and
means for selectively regulating the flow of air from said supply means to each primary air chamber,
said air flow regulating means extending adjacent the burners of a group and having a longitudinal series of apertures.

11. A cooking range comprising
a cabinet having a top plate structure to be heated,
a plurality of burner units mounted in said cabinet spaced below said top plate structure and arranged in groups each located adjacent a selected portion of said top plate structure,
each burner unit including a housing having a mixing chamber and a ceramic burner element spanning the top of said housing and having a plurality of close spaced small apertures arranged uniformly therein,
means for supplying gas to each burner unit including a jet discharging gas into the mixing chamber thereof,
a plurality of primary air chambers constituting the sole source of air to support combustion at said burners,
each air chamber communicating with the mixing chamber of each burner of a group,
means for supplying air under pressure to each primary air chamber,
a flue connected to said cabinet for discharging from said cabinet the products of combustion from said burner elements,
passage-defining means in said cabinet communicating with said air supply means and said flue and located to direct air against portions of said burner housings, and
means for selectively regulating the flow of air from said supply means into said passage-defining means.

12. A cooking range comprising
a cabinet having a top plate structure to be heated,
a plurality of burner units mounted in said cabinet spaced below said top plate structure and arranged in groups each located adjacent a selected portion of said top plate structure,
each burner unit including a housing having a mixing chamber, and a ceramic burner element spanning the top of said housing and having a plurality of close spaced small apertures arranged uniformly therein,
means for supplying gas to each burner unit including a jet discharging gas into the mixing chamber thereof,
a plurality of primary air chambers constituting the sole source of air to support combustion at said burners,
each air chamber communicating with the mixing chamber of each burner of a group,
means for supplying air under pressure to each primary air chamber,
a flue connected to said cabinet for discharging from said cabinet the products of combustion from said burner elements,
passage-defining means in said cabinet communicating with said air supply means and said flue and located to direct air against portions of said burner housings, and
means for selectively regulating the flow of air from said supply means into said passage-defining means,
said passage-defining means being elongated and extending adjacent the burners of a group and having a longitudinal series of spaced apertures along its length.

References Cited by the Examiner

UNITED STATES PATENTS

| | | | |
|---|---|---|---|
| 1,373,307 | 3/1921 | Dallmore | 126—39 |
| 1,637,772 | 8/1927 | Heckel et al. | 158—109 X |
| 1,764,718 | 6/1930 | Gerlich et al. | 126—39 |
| 2,286,766 | 6/1942 | Sherman | 126—39 |
| 2,775,294 | 12/1956 | Schwank | 126—39 X |
| 2,870,830 | 1/1959 | Schwank | 126—39 |
| 2,987,118 | 6/1961 | Brown | 158—99 |

FOREIGN PATENTS 631,337  11/1961  Canada.

FREDERICK L. MATTESON, Jr., *Primary Examiner.*

PERCY L. PATRICK, JAMES W. WESTHAVER, *Examiners.*